United States Patent
Sharifi

(10) Patent No.: US 10,269,346 B2
(45) Date of Patent: *Apr. 23, 2019

(54) MULTIPLE SPEECH LOCALE-SPECIFIC HOTWORD CLASSIFIERS FOR SELECTION OF A SPEECH LOCALE

(71) Applicant: Google LLC, Mountain View, CA (US)

(72) Inventor: Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,732

(22) Filed: Jan. 19, 2017

(65) Prior Publication Data

US 2017/0140756 A1   May 18, 2017

Related U.S. Application Data

(63) Continuation of application No. 14/173,264, filed on Feb. 5, 2014, now Pat. No. 9,589,564.

(51) Int. Cl.
| | |
|---|---|
| *G10L 15/00* | (2013.01) |
| *G10L 15/02* | (2006.01) |
| *G10L 15/08* | (2006.01) |
| *G10L 15/22* | (2006.01) |
| *G10L 15/26* | (2006.01) |
| *G10L 15/32* | (2013.01) |

(52) U.S. Cl.
CPC ............ *G10L 15/22* (2013.01); *G10L 15/005* (2013.01); *G10L 15/02* (2013.01); *G10L 15/08* (2013.01); *G10L 15/26* (2013.01); *G10L 15/32* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | |
|---|---|---|
| 3,742,143 A | 6/1973 | Awipi |
| 4,415,767 A | 11/1983 | Gill et al. |
| 4,665,548 A | 5/1987 | Kahn |
| 4,783,809 A | 11/1988 | Glinski |
| 4,866,755 A | 9/1989 | Hashimoto |

(Continued)

*Primary Examiner* — Fariba Sirjani
(74) *Attorney, Agent, or Firm* — Fish & Richardson P.C.

(57) ABSTRACT

Methods, systems, and apparatus, including computer programs encoded on a computer storage medium, for recognizing speech in an utterance. The methods, systems, and apparatus include actions of receiving an utterance and obtaining acoustic features from the utterance. Further actions include providing the acoustic features from the utterance to multiple speech locale-specific hotword classifiers. Each speech locale-specific hotword classifier (i) may be associated with a respective speech locale, and (ii) may be configured to classify audio features as corresponding to, or as not corresponding to, a respective predefined term. Additional actions may include selecting a speech locale for use in transcribing the utterance based on one or more results from the multiple speech locale-specific hotword classifiers in response to providing the acoustic features from the utterance to the multiple speech locale-specific hotword classifiers. Further actions may include selecting parameters for automated speech recognition based on the selected speech locale.

20 Claims, 4 Drawing Sheets

(56) References Cited

U.S. PATENT DOCUMENTS

| | | |
|---|---|---|
| 4,872,202 A | 10/1989 | Fette |
| 5,195,167 A | 3/1993 | Bahl et al. |
| 5,276,766 A | 1/1994 | Bahl et al. |
| 5,293,451 A | 3/1994 | Brown et al. |
| 5,390,279 A | 2/1995 | Strong |
| 5,420,912 A | 5/1995 | Kopp et al. |
| 5,428,707 A | 6/1995 | Gould et al. |
| 5,465,317 A | 11/1995 | Epstein |
| 5,497,447 A | 3/1996 | Bahl et al. |
| 5,524,169 A | 6/1996 | Cohen et al. |
| 5,553,119 A | 9/1996 | McAllister et al. |
| 5,625,747 A | 4/1997 | Goldberg et al. |
| 5,634,086 A | 5/1997 | Rtischev et al. |
| 5,636,325 A | 6/1997 | Farret |
| 5,664,061 A | 9/1997 | Andreshak et al. |
| 5,675,705 A | 10/1997 | Singhal |
| 5,710,866 A | 1/1998 | Alleva et al. |
| 5,758,023 A | 5/1998 | Bordeaux |
| 5,794,197 A | 8/1998 | Alleva et al. |
| 5,805,771 A | 9/1998 | Muthusamy et al. |
| 5,865,626 A | 2/1999 | Beattie et al. |
| 5,897,618 A | 4/1999 | Loats et al. |
| 5,987,414 A | 11/1999 | Sabourin et al. |
| 6,061,646 A * | 5/2000 | Martino ............... G06F 17/275 379/88.06 |
| 6,085,160 A | 7/2000 | D'Hoore et al. |
| 6,167,377 A | 12/2000 | Gillick et al. |
| 6,272,466 B1 | 8/2001 | Harada et al. |
| 6,304,845 B1 | 10/2001 | Hunlich et al. |
| 6,343,270 B1 | 1/2002 | Bahl et al. |
| 6,434,520 B1 | 8/2002 | Kanevsky et al. |
| 6,510,410 B1 | 1/2003 | Chen et al. |
| 6,675,143 B1 | 1/2004 | Barnes et al. |
| 6,708,150 B1 | 3/2004 | Hirayama et al. |
| 6,839,669 B1 | 1/2005 | Gould et al. |
| 6,961,704 B1 | 11/2005 | Phillips et al. |
| 6,996,525 B2 * | 2/2006 | Bennett ................. G10L 15/32 704/231 |
| 6,999,925 B2 | 2/2006 | Fischer et al. |
| 6,999,932 B1 | 2/2006 | Zhou |
| 7,035,801 B2 | 4/2006 | Jimenez-Feltström |
| 7,139,697 B2 | 11/2006 | Hakkinen et al. |
| 7,155,391 B2 | 12/2006 | Taylor |
| 7,184,957 B2 | 2/2007 | Brookes et al. |
| 7,219,056 B2 | 5/2007 | Axelrod et al. |
| 7,328,155 B2 | 2/2008 | Endo et al. |
| 7,340,395 B2 | 3/2008 | Gurram et al. |
| 7,383,172 B1 | 6/2008 | Jamieson |
| 7,412,374 B1 | 8/2008 | Seiler et al. |
| 7,640,159 B2 | 12/2009 | Reich |
| 7,668,718 B2 | 2/2010 | Kahn et al. |
| 7,716,050 B2 | 5/2010 | Gillick et al. |
| 7,725,318 B2 | 5/2010 | Gavalda et al. |
| 7,974,843 B2 | 7/2011 | Schneider |
| 7,979,266 B2 | 7/2011 | Alpha |
| 8,009,966 B2 | 8/2011 | Bloom et al. |
| 8,073,680 B2 | 12/2011 | Georgiev et al. |
| 8,155,956 B2 | 4/2012 | Cho et al. |
| 8,219,384 B2 | 7/2012 | Lloyd et al. |
| 8,275,616 B2 | 9/2012 | Jung et al. |
| 8,407,057 B2 | 3/2013 | Comerford et al. |
| 8,423,352 B2 | 4/2013 | Lai et al. |
| 8,442,827 B2 | 5/2013 | Duffield |
| 8,521,766 B1 | 8/2013 | Hoarty |
| 8,548,797 B2 | 10/2013 | Kim et al. |
| 8,583,418 B2 | 11/2013 | Silverman et al. |
| 8,612,235 B2 | 12/2013 | Braho et al. |
| 8,635,068 B2 | 1/2014 | Pulz et al. |
| 8,688,451 B2 | 4/2014 | Grost et al. |
| 9,318,107 B1 | 4/2016 | Sharifi |
| 2002/0049596 A1 | 4/2002 | Burchard et al. |
| 2002/0082844 A1 | 6/2002 | Van Gestel |
| 2002/0087313 A1 | 7/2002 | Lee et al. |
| 2002/0087315 A1 | 7/2002 | Lee et al. |
| 2002/0194000 A1 * | 12/2002 | Bennett .................. G10L 15/32 704/270 |
| 2003/0040907 A1 * | 2/2003 | Chang ..................... G10L 15/32 704/231 |
| 2003/0069730 A1 | 4/2003 | Vanhilst |
| 2003/0105623 A1 | 6/2003 | Cyr et al. |
| 2003/0200090 A1 | 10/2003 | Kawazoe |
| 2003/0236664 A1 | 12/2003 | Sharma |
| 2004/0073425 A1 | 4/2004 | Das et al. |
| 2004/0205675 A1 * | 10/2004 | Veerappan .......... G06F 17/2217 715/255 |
| 2005/0108017 A1 | 5/2005 | Esser et al. |
| 2005/0119897 A1 | 6/2005 | Bennett et al. |
| 2005/0171792 A1 | 8/2005 | Lin et al. |
| 2006/0149548 A1 | 7/2006 | Wang et al. |
| 2006/0184370 A1 | 8/2006 | Kwak et al. |
| 2007/0124147 A1 | 5/2007 | Gopinath et al. |
| 2008/0052077 A1 | 2/2008 | Bennett et al. |
| 2008/0221889 A1 | 9/2008 | Cerra et al. |
| 2008/0300886 A1 | 12/2008 | Patch |
| 2009/0204409 A1 | 8/2009 | Mozer et al. |
| 2009/0271195 A1 | 10/2009 | Kitade et al. |
| 2010/0004930 A1 | 1/2010 | Strope et al. |
| 2011/0004473 A1 | 1/2011 | Laperdon et al. |
| 2011/0066634 A1 | 3/2011 | Phillips et al. |
| 2011/0071817 A1 | 3/2011 | Siivola |
| 2011/0144999 A1 | 6/2011 | Jang et al. |
| 2011/0288859 A1 | 11/2011 | Taylor et al. |
| 2012/0271631 A1 | 10/2012 | Weng et al. |
| 2012/0310628 A1 | 12/2012 | Rathod et al. |
| 2012/0330979 A1 | 12/2012 | Tan et al. |
| 2013/0144900 A1 | 6/2013 | Murphy et al. |
| 2013/0183944 A1 | 7/2013 | Mozer et al. |
| 2013/0208991 A1 | 8/2013 | Kawasaki |
| 2013/0238336 A1 | 9/2013 | Sung et al. |
| 2013/0325473 A1 | 12/2013 | Larcher et al. |
| 2013/0325484 A1 * | 12/2013 | Chakladar ............. G06F 3/167 704/275 |
| 2014/0016513 A1 | 1/2014 | Garcia Martin et al. |
| 2014/0108002 A1 | 4/2014 | Pfeifer |
| 2014/0236600 A1 | 8/2014 | Lu et al. |
| 2014/0278435 A1 | 9/2014 | Ganong et al. |
| 2015/0221305 A1 | 8/2015 | Sharifi |
| 2015/0221307 A1 * | 8/2015 | Shah ..................... G10L 15/28 704/253 |
| 2017/0116988 A1 * | 4/2017 | Sharifi ................... G10L 15/08 |

* cited by examiner

MULTIPLE SPEECH LOCALE-SPECIFIC HOTWORD CLASSIFIERS FOR SELECTION OF A SPEECH LOCALE

CROSS-REFERENCE TO RELATED APPLICATION

This is a continuation of U.S. application Ser. No. 14/173,264, filed on Feb. 5, 2014, the disclosure of which is considered part of and is incorporated by reference in the disclosure of this application.

TECHNICAL FIELD

This disclosure generally relates to speech recognition.

BACKGROUND

A computer may analyze a user's utterance and may perform an action in response. For example, a user may say "DRIVE HOME" and a computer may respond with directions for the user to drive home from their current location.

SUMMARY

In general, an aspect of the subject matter described in this specification may involve a process for selecting a speech locale for recognizing speech using the outputs of multiple speech locale-specific hotword classifiers. A speech locale may refer to a particular setting for automatically recognizing speech that is associated with a particular spoken language, e.g., English, French, or Spanish, or a particular spoken dialect of a particular spoken language, e.g., American English or British English. The dialect may be associated with particular terms, e.g., "elevator" instead of "lift" and "cookies" instead of "biscuits," and particular pronunciations for terms, e.g., an accent.

A system may receive voice commands that are associated with a variety of speech locales. For example, a system may receive a voice command "DRIVE HOME" that is in American English and a corresponding voice command "RENTRER À LA MAISON" that is in French. To accurately recognize speech in different languages and different dialects, the system may rely on different speech locale-specific speech recognition models that may be used to more accurately recognize speech in corresponding languages and dialects. For example, the system may use multiple speech locale-specific recognition models, where the system may more accurately recognize American English speech using an American English speech locale-specific model, may more accurately recognize British English speech using a British English speech locale-specific model, and may more accurately recognize French speech using a French speech locale-specific model.

The system may enable a user to manually select a particular speech locale to use to recognize speech. However, some users may never select a particular speech locale and some users may not update the selected speech locale before providing voice commands in another language. If the system does not know which speech locale would result in the most accurate speech recognition for an utterance, the system may need to perform speech recognition using each of the speech recognition models and select the output that appears most accurate, e.g., selecting the output that is a voice command to which the system may respond. However, recognizing speech using a speech recognition model may be a computationally intensive process, and recognizing speech using multiple speech locale-specific speech recognition models may multiply the computational processing needed.

Instead of recognizing speech using all speech locale-specific models, the system may select a particular speech locale-specific model to use to recognize speech. For example, the system may select to use an American English speech locale-specific speech language model. The system may select the particular speech locale-specific model based on the outputs from multiple speech locale-specific hotword classifiers.

The speech locale-specific hotword classifiers may classify whether an utterance likely includes a hotword that is specific to a corresponding speech locale. As used by this specification, a "hotword" may refer to a term that wakes a device up from a sleep state or hibernation state, or a term that triggers speech recognition on the term or on one or more terms that follow the term, e.g., voice commands that follow the hotword. Example hotwords may be "OK COMPUTER" for British English, "OK COMPUTER" (which may be pronounced with less stress on the "O" than pronounced for the British English speech locale) for American English, or "D'ACCORD ORDINATEUR" for French. The system may operate under the assumption that if an utterance includes a voice command that is preceded by a hotword, or begun with a hotword, that corresponds to a particular speech locale, the remaining portion of the utterance that follows will also correspond to the same particular speech locale. Accordingly, the system may perform speech recognition of the utterance using a speech locale-specific speech recognition model that corresponds to the speech locale associated with the hotword that is classified as likely being included in the utterance.

In some aspects, the subject matter described in this specification may be embodied in methods that may include the actions of receiving an utterance and obtaining acoustic features from the utterance. Further actions may include providing acoustic features of the utterance to multiple speech locale-specific hotword classifiers, where each speech locale-specific hotword classifier (i) is associated with a respective speech locale, and (ii) is configured to classify audio features as corresponding to, or as not corresponding to, a respective predefined term. Additional actions may include selecting a speech locale for use in transcribing the utterance based on one or more results from the multiple speech locale-specific hotword classifiers in response to providing the acoustic features from the utterance to the multiple speech locale-specific hotword classifiers. Further actions may include selecting parameters for automated speech recognition based on the selected speech locale.

Other versions include corresponding systems, apparatus, and computer programs, configured to perform the actions of the methods, encoded on computer storage devices.

These and other versions may each optionally include one or more of the following features. For instance, in some implementations two or more of the speech locale-specific hotword classifiers may be associated with different speech locales, and are associated with the same predefined term.

In certain aspects, two or more of the speech locale-specific hotword classifiers may be associated with different speech locales, and are associated with different predefined terms. In some aspects, actions may include transcribing the utterance based on the selected parameters.

In some implementations, providing the acoustic features from the utterance to multiple speech locale-specific hotword classifiers may include providing the acoustic features to a particular speech locale-specific hotword classifier that is associated with multiple other speech locale-specific hotword classifiers and determining to provide the acoustic features to the multiple other speech locale-specific hotword classifiers based on a result from the particular speech locale-specific hotword classifier. The particular speech locale-specific hotword classifier may include a speech locale-specific hotword classifier for a particular language and the multiple other speech locale-specific hotword classifiers associated with the particular speech locale-specific hotword classifier may include speech locale-specific hotword classifiers for particular dialects for the particular language In certain aspects, providing the acoustic features from the utterance to multiple speech locale-specific hotword classifiers may include selecting a subset of speech locale-specific hotword classifiers to provide the acoustic features from a set of speech locale-specific hotword classifiers based on previous selections of speech locales used to transcribe previously received utterances.

In some aspects, selecting a speech locale for use in transcribing the utterance based on one or more results from the multiple speech locale-specific hotword classifiers in response to providing the acoustic features from the utterance to the multiple speech locale-specific hotword classifiers may include obtaining speech locale-specific hotword confidence scores from the speech locale-specific hotword classifiers, determining a highest speech locale-specific hotword confidence score from the speech locale-specific hotword confidence scores, and selecting a speech locale associated with the determined highest speech locale-specific hotword confidence score.

In some implementations, selecting a speech locale for use in transcribing the utterance based on one or more results from the multiple speech locale-specific hotword classifiers in response to providing the acoustic features from the utterance to the multiple speech locale-specific hotword classifiers may include obtaining speech locale-specific hotword confidence scores from the speech locale-specific hotword classifiers, determining a predetermined number of highest speech locale-specific hotword confidence scores from the speech locale-specific hotword confidence scores, selecting speech locales associated with the determined highest speech locale-specific hotword confidence scores, and for each of the selected speech locales, obtaining a recognition confidence score from an automated speech recognizer, where obtaining a transcription of the utterance based on the selected speech locale may include selecting a transcription corresponding to a highest combination of the speech locale-specific hotword confidence scores and the recognition confidence scores.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
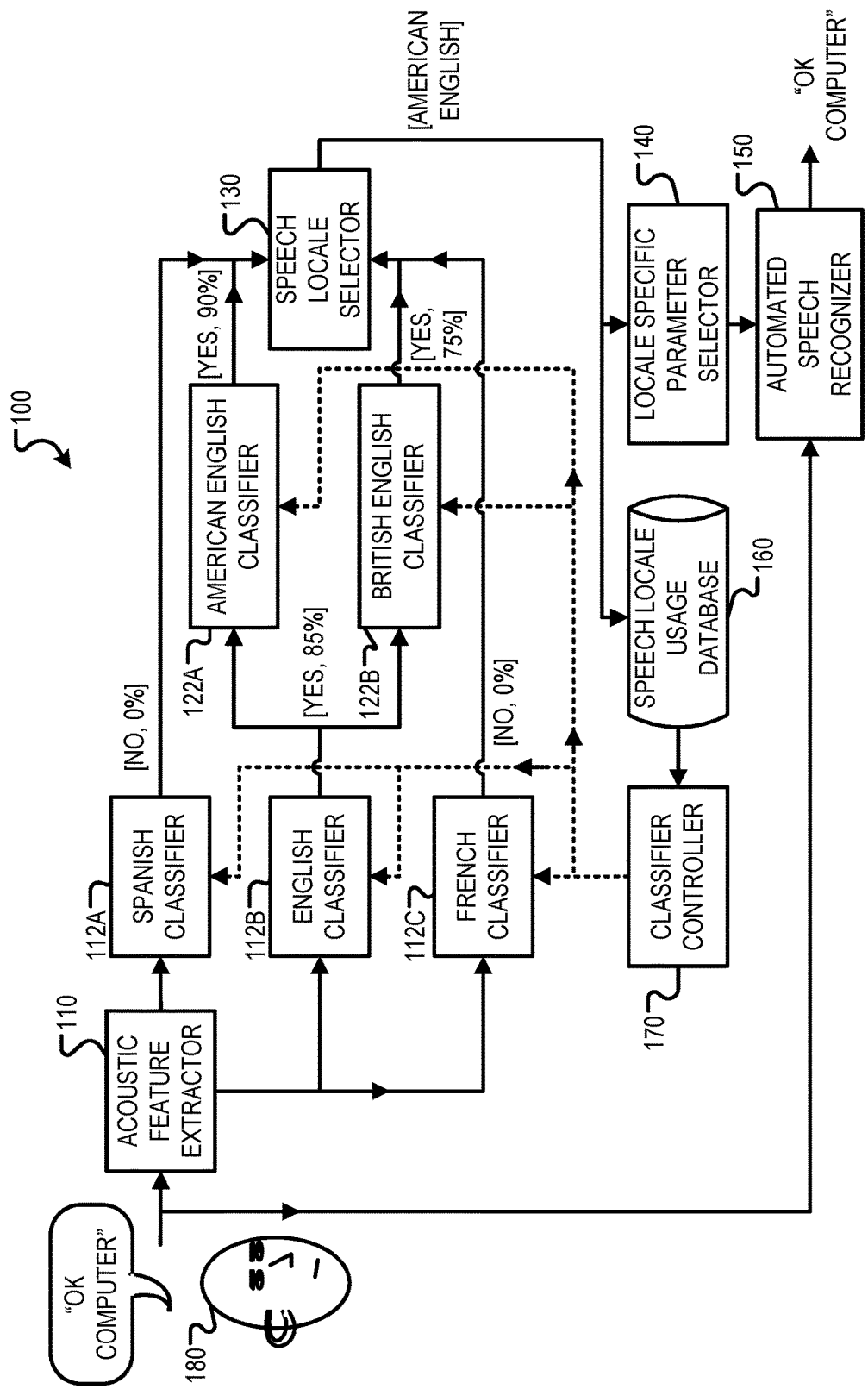
FIG. 1 is a block diagram of an example system for selecting a speech locale for recognizing speech in an utterance based on the outputs of multiple speech locale-specific hotword classifiers.

FIG. 1 is a block diagram of an example system 100 for selecting a speech locale for recognizing speech in an utterance based on the outputs of multiple speech locale-specific hotword classifiers. Generally, the system 100 may include an acoustic feature extractor 110 that extracts acoustic features from utterances, multiple speech locale-specific hotword classifiers 112A-C, 122A-B that classify whether utterances likely include corresponding speech locale-specific hotwords, a speech locale selector 130 that selects a particular speech locale, a locale-specific parameter selector 140 that selects locale-specific parameters, an automated speech recognizer 150 that recognizes speech according to locale-specific parameters, a speech locale usage database 160 that stores usage of speech locales, and a classifier controller 170 that controls the speech locale-specific hotword classifiers 112A-C, 122A-B.

The acoustic feature extractor 110 may receive sounds corresponding to an utterance (in the figure, "OK COMPUTER") said by a user 180, where the sounds may be captured by an audio capture device, e.g., a microphone that converts sounds into an electrical signal. The acoustic feature extractor 110 may extract acoustic features from the utterance. The acoustic features may be Mel-frequency cepstrum coefficients (MFCCs) or filter bank energies computed over windows of an audio signal.

The speech locale-specific hotword classifiers 112A-C may obtain the acoustic features extracted by the acoustic feature extractor 110. Each of the classifiers 112A-C may be associated with a respective speech locale. For example, the classifier 112A may be associated with the Spanish speech locale, the classifier 112B may be associated with the English speech locale, and the classifier 112C may be associated with the French speech locale.

Based on the extracted features, the speech locale-specific hotword classifiers 112A-C may classify whether an utterance likely includes a respective corresponding speech locale-specific hotword. For example, based on the extracted features, the Spanish classifier 112A may classify whether the utterance "OK COMPUTER" likely includes the Spanish speech locale-specific hotword, "OYE ORDENADOR," the English classifier 112B may classify whether the utterance likely includes the English speech locale-specific hotword, "OK COMPUTER," and the French classifier 112C may classify whether the utterance likely includes the speech locale-specific hotword, "D'ACCORD ORDINATEUR." While classifiers 112A-C are shown in the system 100, the system 100 may include additional classifiers, e.g., classifiers for German, Chinese, or Japanese, or fewer classifiers, e.g., no Spanish classifier 112A.

A hotword may be a predefined term that wakes a device up from a sleep state or hibernation state, or a predefined term that triggers speech recognition on the term or on one or more terms that follow the term, e.g., on voice commands that follow the hotword. Hotwords may be useful for "always on" systems that may potentially pick up sounds that are not directed to the system. For example, the use of hotwords may help the system 100 discern when a given utterance is directed at the system 100, as opposed to an utterance that is directed to another individual present in the environment or a background utterance. In doing so, the system 100 may avoid computationally expensive processing, e.g., semantic interpretation, on sounds or utterances that do not include a hotword. The system 100 may operate under the assumption that if an utterance includes a voice command that is preceded by a hotword, or begun with a hotword, that corresponds to a particular speech locale, the remaining portion of the utterance that follows will also correspond to the same particular speech locale. Accordingly, the system 100 may perform speech recognition of the utterance using a speech locale-specific speech recognition model that corresponds to the speech locale associated with the hotword that is classified as likely being included in the utterance.

The classifiers 112A-C may output a result that may be a binary result, e.g., "YES" or "NO," that indicates if the utterance is classified as likely including the respective speech locale-specific hotword corresponding to the classifier. The classifiers 112A-C may additionally or alternatively output a result that may be a non-binary result, e.g., a confidence score of 0%, 10%, 30%, 75%, or 98%, that may indicate a confidence on the likelihood that the utterance includes the respective speech locale-specific hotword corresponding to the classifier. For example, in response to receiving extracted acoustic features for the utterance "OK COMPUTER" in American English, the Spanish classifier 112A may output the result "NO, 0%," the English classifier 112B may output the results "YES, 85%," and the French classifier 112C may output the result "NO, 0%." The confidence scores may additionally or alternatively be represented by a range of numbers between "0" and "1," e.g., "0.25" corresponding to "25%."

The classifiers 112A-C may classify the acoustic features in parallel to reduce latency. To reduce processing, the system 100 may include the classifiers 112A-C in a hierarchy where classifiers 112A-C may be in a top level and classifiers 122A-B may be in a sub level that may depend from the top level classifiers 112A-C. The top level classifiers 112A-C may be specific to particular languages and the sub level classifiers 122A-B may be specific to particular dialects of the particular languages. For example, the top level English classifier 112B may correspond to a classifier that has been trained to detect "OK COMPUTER" as spoken in English, whether American English or British English, a first sub level classifier 122A may correspond to a classifier that has been trained to detect "OK COMPUTER" as spoken in American English, and a second sub level classifier 122B may correspond to a classifier that has been trained to detect "OK COMPUTER" as spoken in British English. The hotword "OK COMPUTER" for American English may include the same terms as the hotword "OK COMPUTER" for British English, but may be pronounced slightly differently.

When the top level classifier 112B from which the sub level classifiers 122A-B depend from classify that the utterance may likely include a hotword that corresponds to a particular language, each of the sub level classifiers may classify whether an utterance likely includes a respective corresponding speech locale-specific hotword pronounced according to a respective dialect of the particular language. For example, in response to receiving acoustic features for the utterance "OK COMPUTER" that is said in American English, the English classifier 112B may output the result of "YES, 85%," indicating that the utterance is classified as likely including a English hotword pronounced in English, and that the classification has a 85% confidence score. Based on the English classifier 112B classifying that the utterance likely includes a hotword in English, the American English classifier 122A and British English classifier 122B may obtain the extracted acoustic features to classify whether the utterance likely includes an American English hotword pronounced in American English or a British English hotword pronounced in British English, respectively.

In an example, the American English classifier 122A may provide the output of "YES, 90%" for the utterance "OK COMPUTER" pronounced in American English. The output may indicate that the utterance is classified as likely including a hotword pronounced in American English and that the classification has a 90% confidence score. The British English classifier 122B may provide the output of "YES, 75%" for the utterance "OK COMPUTER" in British English, the output indicating that the utterance is classified as likely including a hotword in British English and that the classification has a 75% confidence score.

While the above example describes sub level classifiers 122A-B performing classification when the corresponding top level classifier 112B outputs a "YES," the sub level classifiers 122A-B may additionally or alternatively classify an utterance when the corresponding top level classifier 112B outputs a confidence score above a predetermined threshold, e.g., 50%, 75%, 90%. While not shown in FIG. 1, the system 100 may additionally or alternatively include dependent sub level classifiers for other top level classifiers 112A, 112C. For example, the system 100 may include a Latin American Spanish classifier, a Castilian Spanish classifier, and a Caribbean Spanish classifier, that may all depend from the Spanish classifier 112A. The system 100 may additionally or alternatively include additional levels of classifiers. For example, the system 100 may include a third level of classifiers for a Boston American English classifier, a New York American English classifier, and a New Orleans American English classifier, that may all depend from the American English classifier 122A.

Use of a hierarchy of classifiers 112A-C, 122A-B in the system 100 may reduce processing by reducing the number of classifiers that process the acoustic features because processing by speech locale-specific hotword classifiers for dialects may be skipped when an utterance is not classified as including a hotword in a language for the dialects. For example, when the English classifier 112B classifies the utterance as likely not including a hotword in English, the classification of the utterance for dialects of the English language by the American English classifier 122A and the British English classifier 122B may be skipped.

In some implementations, the system 100 may not include a hierarchy of classifiers 112A-C, 122A-B and all classifiers may be on the same level and used to classify the utterance. For example, in a system where reducing latency may be more important than reducing processing, classifiers 112A-C and 122A-B may all classify an utterance in parallel. In some implementations, the classifiers 112A-C may classify the acoustic features sequentially or at least partially in parallel. For example, the Spanish classifier 112A may first classify the utterance, the English classifier 112B may next classify the utterance, and the French classifier 112 may lastly classify the utterance.

The speech locale selector 130 may receive results from the classifiers 112A-C, 122A-B and select a speech locale for use in transcribing the utterance based on the results. For example, for the utterance "OK COMPUTER" in American English, the speech locale selector 130 may receive the results "NO, 0%" from the Spanish classifier 112A, "YES, 85%" from the English classifier 112B, "YES, 90%" from the American English classifier 122A, "YES, 75%" from the British English classifier 122B, and "NO, 0%" from the French classifier 112C. Based on the results, the speech locale selector 130 may then select the speech locale of American English for use in transcribing the utterance.

The speech locale selector 130 may select the speech locale that corresponds to the classifier that outputs the highest confidence score. For example, the speech locale selector 130 may determine that the highest confidence score is 90% and that the highest confidence score is from the American English classifier 122A. Based on determining the highest confidence score is from the American English classifier 122A, the speech locale selector 130 may select the speech locale to American English.

In some implementations, the speech locale selector 130 may select the speech locale that corresponds to the classifier that provides a binary indication that a respective hotword may be included in an utterance. For example, if the system 100 did not include the American English classifier 122A and the British English classifier 122B, the system 100 may select English as the speech locale as the English classifier 112B may be the only classifier that outputs a "YES" indicating that the utterance is classified as likely including a hotword specific to English.

The locale-specific parameter selector 140 may receive an indication of the speech locale selected by the speech locale selector 130. For example, the locale-specific parameter selector 140 may receive an indication that the speech locale selector 130 has selected to use American English as the speech locale. Based on the indication, the locale-specific parameter selector 140 may select parameters for automated speech recognition. For example, the locale-specific parameter selector 140 may select to use parameters for automated speech recognition that correspond to parameters that more accurately recognize American English speech. The parameters may specify using a speech recognition model that corresponds to the selected speech locale. For example, the locale-specific parameter selector 140 may select parameters that specify using an American English speech recognition model for recognizing speech in an utterance when the American English speech locale is selected.

The automated speech recognizer 150 may receive the parameters selected by the locale-specific parameter selector 140 and recognize speech based on the parameters. For example, the automated speech recognizer 150 may receive sounds corresponding to an utterance "OK COMPUTER" in American English said by the user 180, receive locale-specific parameters for more accurately recognizing speech in American English, and accurately recognize the words "OK COMPUTER" in the utterance based on the locale-specific parameters for recognizing speech in American English.

The speech locale usage database 160 may receive an indication of the speech locale selected by the speech locale selector 130. For example, the speech locale usage database 160 may receive an indication that American English was selected by the speech locale selector 130. The speech locale usage database 160 may track usage of speech locales based on the received indications. For example, the speech locale usage database 160 may receive one hundred indications, where sixty indications are for selections of American English and forty indications are for selections of French, and may store data indicating that American English was selected sixty times and French was selected forty times.

The classifier controller 170 may obtain speech locale usage data from the speech locale usage database 160 and control the speech locale-specific hotword classifiers 112A-C, 122A-B based on the speech locale usage data. For example, the classifier controller 170 may disable particular locale-specific hotword classifiers to reduce computational processing. Disabled classifiers may not classify whether an utterance likely includes a hotword that corresponds to the classifier.

The system 100 may disable a particular locale-specific hotword classifier after the speech locale selector 130 does not select the speech locale corresponding to the particular speech locale-specific hotword classifier after a threshold number, e.g., twenty, fifty, one hundred, of utterances have been received by the system 100. For example, the classifier controller 170 may obtain speech locale usage data from the speech locale usage database 160 that indicates that a hundred utterances have been received and that American English was selected sixty times and that French was selected the remaining forty times, determine that the speech locale usage data indicates that the Spanish speech locale and the British English speech locale have not been selected before after one hundred of utterances have been received by the system 100, and based on the determination, disable the Spanish classifier 112A and the British English classifier 122B.

Additionally or alternatively, the system 100 may disable a particular locale-specific hotword classifier after the speech locale-specific classifier does not classify that an utterance likely includes a speech locale-specific hotword corresponding to the speech locale-specific classifier after a threshold number, e.g., twenty, fifty, one hundred, of utterances have been received by the system 100. For example, the classifier controller 170 may obtain speech locale usage data from the speech locale usage database 160 that indicates that the British English speech locale-specific hotword classifier 122B has not classified that an utterance likely includes a British English hotword after one hundred utterances have been received by the system 100, and based on the determination, disable the British English classifier 122B.

The classifier controller 170 may disable the classifiers 112A-C, 122A-B using control signals. For example, the classifier controller 170 may provide each classifier 112A-C, 122A-B a control signal that may enable or disable the classifier. In some implementations, each classifier may be enabled by default until the classifier controller 170 provides a control signal to the classifier to disable the classifier. In some implementations, the classifier controller 170 may initially provide a control signal to each classifier that enables the classifier, and to disable a classifier, may stop providing the particular control signal that enables the classifier.

In some implementations, the system 100 may allow a user 180 to select to enable or disable speech locale-specific classifiers 112A-C, 122A-B. For example, the user 180 may disable the French classifier 112C and after the Spanish classifier 112A is disabled, enable the Spanish classifier 112A and indicate that the Spanish classifier 112A should always be enabled.

In some implementations, the speech locale usage data may also be used by the speech locale selector 130 to select a speech locale. For example, the speech locale selector 130 may weight confidence scores from the classifiers 112A-C, 122A-B based on speech locale usage data. The speech locale selector 130 may weight confidence scores from the classifiers 112A-C, 122A-B by increasing the confidence scores from classifiers 112A-C, 122A-B corresponding to speech locales that have recently been selected. For example, if the system 100 selected British English for a previous utterance received just before receiving the utterance, the system 100 may select to use the speech locale for British English even if the confidence score from the British English classifier 122B, e.g., "75%", is not the highest confidence score received, e.g., lower than "90%" confidence score from the American English classifier 122A.

The speech locale selector 130 may select to use the British English speech locale based on determining that the voice command that was just previously received was in British English, and based on the determination increasing the confidence score, e.g., "75%," from the British English classifier 122B by a predetermined weight, e.g., 10%, 25%, 33%, 50%. The speech locale selector 130 may then determine that the weighted confidence score from the British English classifier 122B is the highest confidence score. Based on the determination, the speech locale selector 130 may select British English as the speech locale 130.

In some implementations, the speech locale selector 130 may weight confidence scores from the classifiers 112A-C, 122A-B by increasing the confidence scores from classifiers 112A-C, 122A-B corresponding to speech locales that have been frequently selected. For example, if the system 100 frequently selects British English, the system 100 may select to use the speech locale for British English even if the confidence score from the British English classifier 122B, e.g., "75%", is not the highest confidence score received, e.g., lower than "90%" confidence score from the American English classifier 122A. In some implementations, the speech locale selector 130 may weight confidence scores from the classifiers 112A-C, 122A-B by increasing the confidence scores from classifiers 112A-C, 122A-B that the user 180 has indicated the user 180 is likely to use.

In some implementations, the speech locale selector 130 may select a subset of the speech locales, e.g., the speech locales associated with the top two, three or four scores, so that the system 100 performs automated speech recognition of the utterance using the subset of speech locales. The system 100 may then compute a combined confidence based on the confidence score from the classifiers 112A-C, 122A-B and confidence scores from the automated speech recognizer 150 for each of the speech locales, and select the transcription corresponding to the highest combined confidence score.

In some implementations, each classifier may detect a single hotword. Accordingly, for a speech locale that is associated with multiple hotwords, the system 100 may include multiple classifiers for the speech locale as the system 100 may include a classifier for each hotword. For example, besides the hotword "OK COMPUTER," American English may include the hotwords "HEY COMPUTER" and "VOICE COMMAND." Accordingly, the system 100 may include a second American English classifier that detects the hotword "HEY COMPUTER" in American English and a third American English classifier that detects the hotword "VOICE COMMAND." In such implementations, the speech locale usage database 160 may store data indicating the particular classifier that classified that the utterance likely includes the hotword. For example, the speech locale usage database 160 may store data indicating that the classifier for the hotword "VOICE COMMAND" has not classified an utterance as likely including "VOICE COMMAND" in American English after one hundred utterances. Based on the speech locale usage data, the classifier controller 170 may disable a particular classifier from multiple classifiers for a particular speech locale. For example, the classifier controller 170 may disable the classifier for the hotword "VOICE COMMAND" without disabling the classifiers for the hotwords "OK COMPUTER" and "HEY COMPUTER."

Different configurations of the system 100 may be used where functionality of the acoustic feature extractor 110, the multiple speech locale-specific hotword classifiers 112A-C, 122A-B, the speech locale selector 130, the locale-specific parameter selector 140, the automated speech recognizer 150, the speech locale usage database 160, and the classifier controller 170 may be combined, further separated, distributed, or interchanged. The system 100 may be implemented in a single device or distributed across multiple devices.

Figure 2:
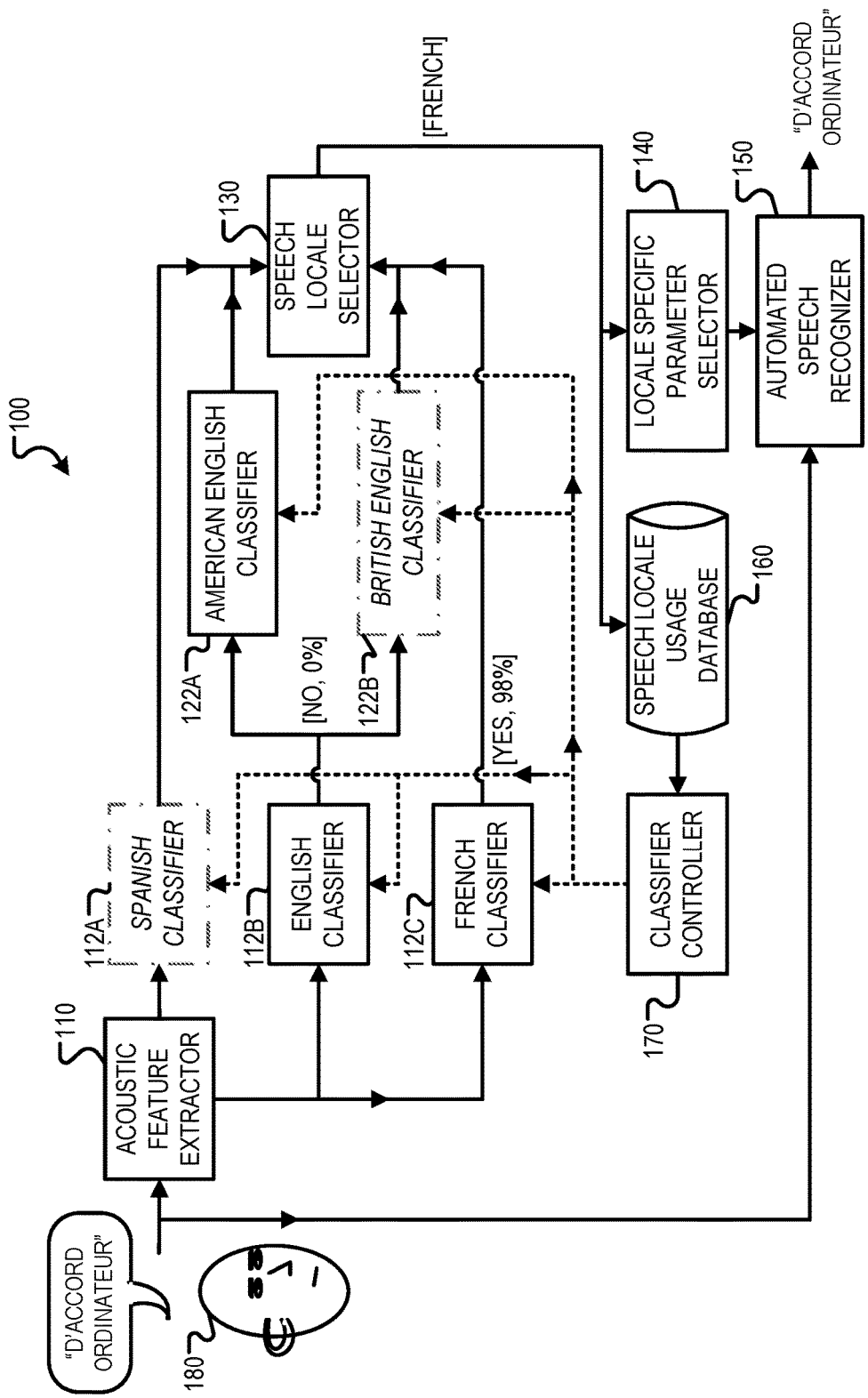
FIG. 2 is a block diagram of an example system for selecting a speech locale for recognizing speech in an utterance that shows disabled speech locale-specific hotword classifiers.

FIG. 2 is a block diagram of an example system 100 for selecting a speech locale for recognizing speech in an utterance that shows disabled speech locale-specific hotword classifiers 112A, 122B. As described above in regards to FIG. 1, the classifier controller 170 may disable classification by classifiers 112A-C, 122A-B based on speech locale usage data.

As shown in FIG. 2, the system 100 may be similar or identical in architecture to the system 100 shown in FIG. 1. However, in the system 100 of FIG. 2, the Spanish classifier 112A and the British English classifier 122B may be disabled, as indicated by the broken lines around the classifiers 112A, 122B, by the classifier controller 170 based on speech locale usage data. For example, the classifier controller 170 may disable the Spanish classifier 112A and the British English classifier 122B based on determining that speech locale usage data indicates that out of the first hundred utterances received by the system 100, the Spanish speech locale and British English speech locale were not selected.

When the system 100 receives sounds for an utterance "D'ACCORD ORDINATEUR" that corresponds to a hotword in French, the acoustic feature extractor 110 may similarly extract acoustic features from the sounds. However, as the Spanish classifier 112A and the British English classifier 122B may be disabled, initially, only the English classifier 112B and the French classifier 112C may classify whether the utterance likely includes a hotword in the speech locales corresponding to the classifiers. For example, the English classifier 112B may classify whether the utterance likely includes a hotword "OK COMPUTER" in English, whether American English or British English, and the French classifier may classify whether the utterance likely includes a hotword "D'ACCORD ORDINATEUR" in French.

The English classifier 112B may output "NO, 0%" indicating that the utterance is classified as not likely including the hotword "OK COMPUTER" in English and the French classifier 112C may output "YES, 98%," indicating that the utterance is classified as likely including a hotword "D'ACCORD ORDINATEUR." As the Spanish classifier 112A may be disabled, the Spanish classifier 112A may not classify the utterance, as illustrated by the lack of an output from the Spanish classifier 112A. Further, because the English classifier 112B has output "NO," the American English classifier 122A may not classify the utterance.

The speech locale selector may receive the results of "NO, 0%" from the English classifier 112B and "YES, 98%" from the French classifier 112C. The speech locale selector 130 may function similarly as described above in regards to FIG. 1 to determine the highest confidence score and select the speech locale corresponding to the classifier that outputs the highest confidence score. For example, the speech locale selector 130 may determine that 98% is the highest confidence score, determine that the French classifier 112C outputs 98%, and based on the determination, select French as the speech locale.

Also similarly to as described above in regards to FIG. 1, the locale-specific parameter selector 140 may receive an indication that French was selected as the speech locale and select locale-specific parameters for the French speech locale. The automated speech recognizer 150 may then accurately transcribe the utterance "D'ACCORD ORDINATEUR" in French as "D'ACCORD ORDINATEUR" based on the selected locale-specific parameters. The speech locale usage database 160 may be updated based on the speech locale selected by the speech locale selector 130, and the classifier controller 170 may enable or disable the classifiers 112A-C, 122A-B based on data stored in the speech locale usage database 160.

Figure 3:
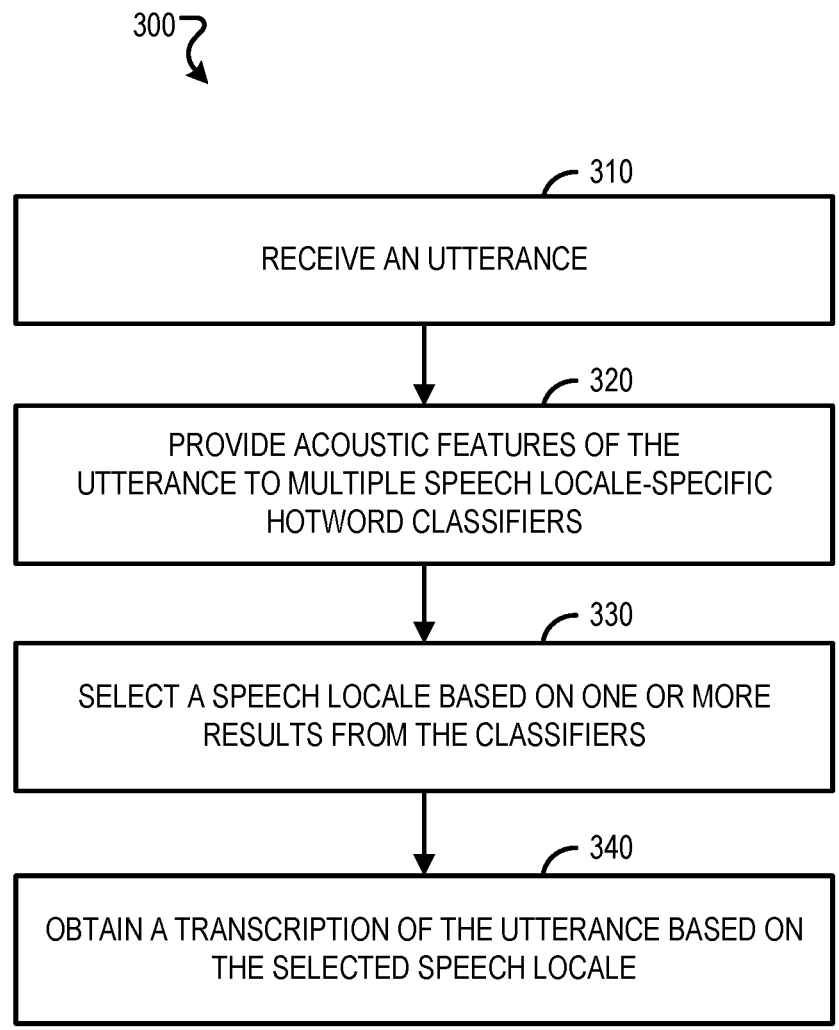
FIG. 3 is a flowchart of an example process for selecting a speech locale for recognizing speech in an utterance based on the outputs of multiple speech locale-specific hotword classifiers.

FIG. 3 is a flowchart of an example process 300 for selecting a speech locale for recognizing speech in an utterance based on the outputs of multiple speech locale-specific hotword classifiers. The following describes the processing 300 as being performed by components of the system 100 that are described with reference to FIG. 1. However, the process 300 may be performed by other systems or system configurations.

The process 300 may include receiving an utterance (310). For example, the acoustic feature extractor 110 may receive sounds corresponding to an utterance "OYE ORDENADOR" in Spanish said by the user 180. The acoustic feature extractor 110 may extract acoustic features from the utterance. The acoustic features may be Mel-frequency cepstrum coefficients (MFCCs) or filter bank energies computed over windows of an audio signal.

The process 300 may include providing acoustic features of the utterance to multiple speech locale-specific hotword classifiers (320). For example, the acoustic feature extractor 110 may provide extracted acoustic features to top level speech locale-specific hotword classifiers 112A-C. Each of the classifiers 112A-C may be associated with a respective speech locale and based on the extracted features, may classify whether an utterance likely includes a hotword associated with a respective corresponding speech locale. For example, based on the extracted features, the Spanish classifier 112A may classify whether the utterance "OYE ORDENADOR" includes the hotword, "OYE ORDENADOR," the English classifier 112B may classify whether the utterance includes the hotword, "OK COMPUTER," and the French classifier 112C may classify whether the utterance includes the hotword, "D'ACCORD ORDINATEUR."

The classifiers 112A-C may output a result that may be a binary result, e.g., "YES" or "NO," that indicates if the utterance is classified as likely including the respective speech locale-specific hotword associated with the speech locale corresponding to the classifier and a non-binary result, e.g., 0%, 10%, 30%, 75%, 98%, that may indicate a confidence that the utterance includes the respective speech locale-specific hotword corresponding to the classifier. For example, in response to receiving extracted acoustic features for the utterance "OYE ORDENADOR" in Spanish, the Spanish classifier 112A may output the result "YES, 95%," the English classifier 112B may output the results "NO, 10%," and the French classifier 112C may output the result "NO, 5%."

The process 300 may include selecting a speech locale based on one or more results from the classifiers (330). For example, the speech locale selector 130 may determine that the highest confidence score is 95% and that the highest confidence score is from the Spanish classifier 112A. Based on determining the highest confidence score is from the Spanish classifier 112A, the speech locale selector 130 may select the speech locale of Spanish that corresponds to the Spanish classifier 112A.

The process 300 may include obtaining a transcription of the utterance based on the selected speech locale (340). For example, the locale-specific parameter selector 140 may receive an indication that the speech locale selector 130 has selected Spanish as the speech locale, and based on the indication, may select locale-specific parameters for automated speech recognition that correspond to parameters for more accurately recognizing Spanish speech. The automated speech recognizer 150 may receive sounds corresponding to an utterance "OYE ORDENADOR" in Spanish said by the user 180, receive the locale-specific parameters for more accurately recognizing speech in Spanish, and generate an accurate transcription "OYE ORDENADOR" for the utterance based on the locale-specific parameters for more accurately recognizing speech in Spanish.

Figure 4:
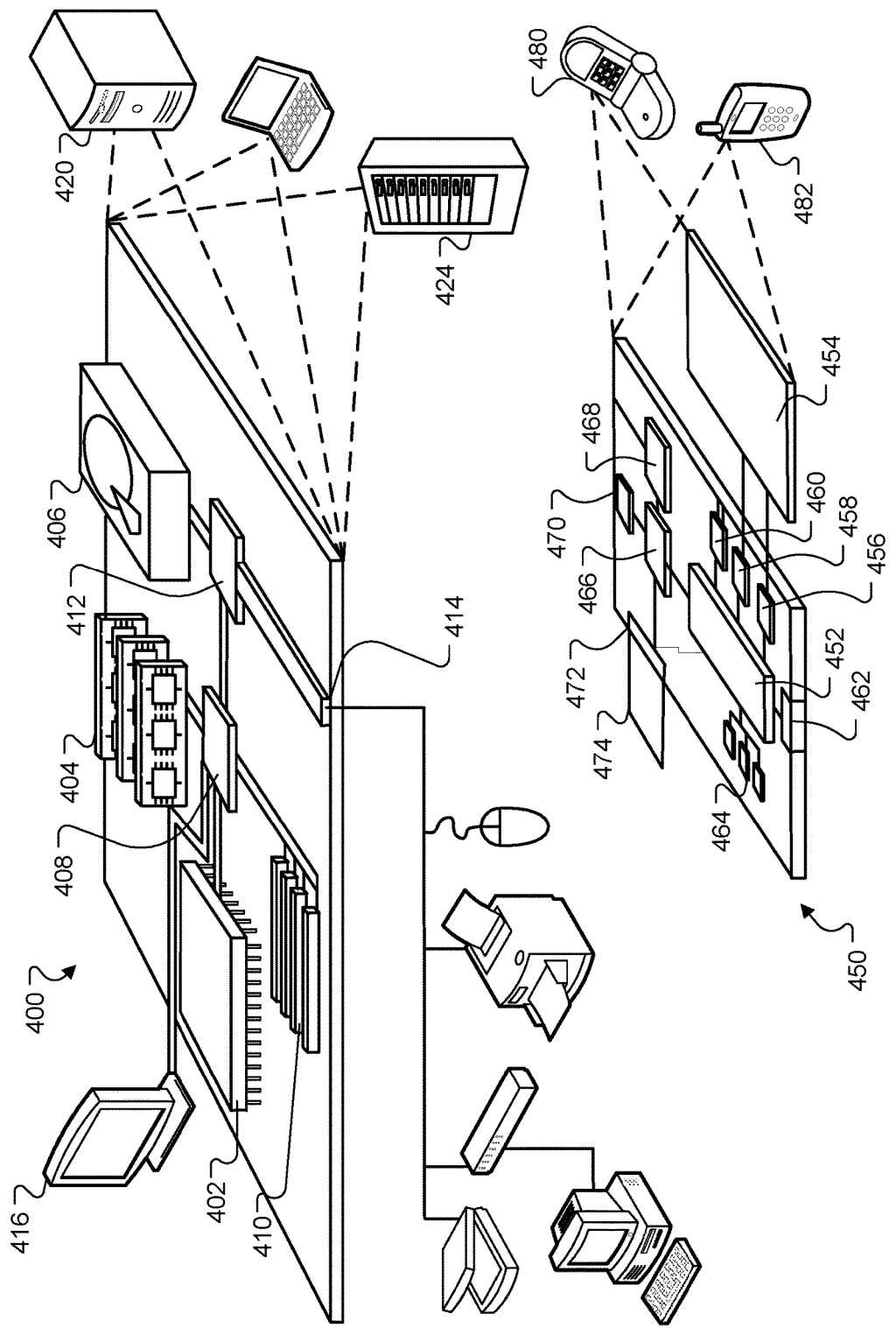
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
receiving, by a mobile computing device that is configured to exit a low power mode upon detection of one of a set of predefined hotwords that are each associated with a respective language or dialect, audio data corresponding to a user speaking a particular, predefined hotword of the set;
in response to receiving the audio data corresponding to the user speaking the particular, predefined hotword, providing acoustic features of the audio data to multiple hotword classifiers, wherein each hotword classifier is (i) associated with a single language or single dialect of language and (ii) configured to classify acoustic features as either corresponding to, or not corresponding to, an utterance of a respective predefined term in the associated single language or single dialect of language without transcribing words corresponding to the acoustic features and without semantically interpreting the acoustic features; and
identifying a respective language or dialect associated with the particular, predefined hotword by determining one hotword classifier of the multiple hotword classifiers that classifies the particular, predefined hotword as corresponding to an utterance of a respective predefined term in the associated single language or single dialect of language of the hotword classifier; and
generating a transcription of subsequently received audio data by an automated speech recognizer that is configured for the identified respective language or dialect associated with the particular, predefined hotword.

2. The method of claim 1, wherein the mobile computing device is configured to detect the set of predefined hotwords using two or more language or dialect-specific hotword classifiers that are each associated with a different language or dialect, and that are each associated with the same particular, predefined hotword.

3. The method of claim 1, wherein the mobile computing device is configured to detect the set of predefined hotwords using two or more language or dialect-specific hotword classifiers that are each associated with a different language or dialect, and that are associated with a different, locale-specific hotword.

4. The method of claim 1, comprising selecting a subset of language or dialect-specific hotword classifiers to provide acoustic features of an the initial portion of the audio data from among a set of language or dialect-specific hotword classifiers, based on previous selections of languages or dialects used to transcribe previously received utterances.

5. The method of claim 1, comprising identifying, based on confidence scores that are each output by a different locale-specific hotword detectors, the particular language or dialect that is associated with the particular, predefined hotword.

6. The method of claim 1, comprising selecting a set of speech recognition parameters for use by the automated speech recognizer based at least on the particular language or dialect.

7. The method of claim 1, comprising processing, at least partially in parallel, the audio data by multiple locale-specific hotword detectors.

8. A system comprising:
one or more computers and one or more storage devices storing instructions that are operable, when executed by the one or more computers, to cause the one or more computers to perform operations comprising:
receiving, by a mobile computing device that is configured to exit a low power mode upon detection of one of a set of predefined hotwords that are each associated with a respective language or dialect, audio data corresponding to a user speaking a particular, predefined hotword of the set; and
in response to receiving the audio data corresponding to the user speaking the particular, predefined hotword, providing acoustic features of the audio data to multiple hotword classifiers, wherein each hotword classifier is (i) associated with a single language or single dialect of language and (ii) configured to classify acoustic features as either corresponding to, or not corresponding to, an utterance of a respective predefined term in the associated single language or single dialect of language without transcribing words corresponding to the acoustic features and without semantically interpreting the acoustic features;

identifying a respective language or dialect associated with the particular, predefined hotword by determining one hotword classifier of the multiple hotword classifiers that classifies the particular, predefined hotword as corresponding to an utterance of a respective predefined term in the associated single language or single dialect of language of the hotword classifier; and generating a transcription of subsequently received audio data by an automated speech recognizer that is configured for the identified respective language or dialect associated with the particular, predefined hotword.

9. The system of claim 8, wherein the mobile computing device is configured to detect the set of predefined hotwords using two or more language or dialect-specific hotword classifiers that are each associated with a different language or dialect, and that are each associated with the same particular, predefined hotword.

10. The system of claim 8, wherein the mobile computing device is configured to detect the set of predefined hotwords using two or more language or dialect-specific hotword classifiers that are each associated with a different language or dialect, and that are associated with a different, locale-specific hotword.

11. The system of claim 8, wherein the operations comprise selecting a subset of language or dialect-specific hotword classifiers to provide acoustic features of an initial portion of the audio data from among a set of language or dialect-specific hotword classifiers, based on previous selections of languages or dialects used to transcribe previously received utterances.

12. The system of claim 8, wherein the operations comprise identifying, based on confidence scores that are each output by a different locale-specific hotword detectors, the particular language or dialect that is associated with the particular, predefined hotword.

13. The system of claim 8, wherein the operations comprise selecting a set of speech recognition parameters for use by the automated speech recognizer based at least on the particular language or dialect.

14. The system of claim 8, wherein the operations comprise processing, at least partially in parallel, the audio data by multiple locale-specific hotword detectors.

15. A non-transitory computer-readable medium storing instructions executable by one or more computers which, upon such execution, cause the one or more computers to perform operations comprising:

receiving, by a mobile computing device that is configured to exit a low power mode upon detection of one of a set of predefined hotwords that are each associated with a respective language or dialect, audio data corresponding to a user speaking a particular, predefined hotword of the set;

in response to receiving the audio data corresponding to the user speaking the particular, predefined hotword, providing acoustic features of the audio data to multiple hotword classifiers, wherein each hotword classifier is (i) associated with a single language or single dialect of language and (ii) configured to classify acoustic features as either corresponding to, or not corresponding to, an utterance of a respective predefined term in the associated single language or single dialect of language without transcribing words corresponding to the acoustic features and without semantically interpreting the acoustic features; and identifying a respective language or dialect associated with the particular, predefined hotword by determining one hotword classifier of the multiple hotword classifiers that classifies the particular, predefined hotword as corresponding to an utterance of a respective predefined term in the associated single language or single dialect of language of the hotword classifier; and generating a transcription of subsequently received audio data by an automated speech recognizer that is configured for the identified respective language or dialect associated with the particular, predefined hotword.

16. The medium of claim 15, wherein the mobile computing device is configured to detect the set of predefined hotwords using two or more language or dialect-specific hotword classifiers that are each associated with a different speech locale, and that are each associated with the same particular, predefined hotword.

17. The medium of claim 15, wherein the mobile computing device is configured to detect the set of predefined hotwords using two or more speech locale-specific hotword classifiers that are each associated with a different speech locale, and that are associated with a different, locale-specific hotword.

18. The medium of claim 15, wherein the operations comprise selecting a subset of language or dialect-specific hotword classifiers to provide acoustic features of an the initial portion of the audio data from among a set of language or dialect-specific hotword classifiers, based on previous selections of languages or dialects used to transcribe previously received utterances.

19. The medium of claim 15, wherein the operations comprise identifying, based on confidence scores that are each output by a different locale-specific hotword detectors, the particular language or dialect that is associated with the particular, predefined hotword.

20. The medium of claim 15, comprising selecting a set of speech recognition parameters for use by the automated speech recognizer based at least on the particular language or dialect.

* * * * *